United States Patent
Akamatsu et al.

(10) Patent No.: US 9,661,363 B2
(45) Date of Patent: *May 23, 2017

(54) RECEIVER SET, INFORMATION APPARATUS AND RECEIVING SYSTEM

(71) Applicant: HITACHI MAXELL, LTD., Osaka (JP)

(72) Inventors: Chiyo Akamatsu, Yokohama (JP); Tetsuo Shinagawa, Odawara (JP); Yoshimichi Kudo, Fujisawa (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,901

(22) Filed: Sep. 5, 2014

(65) Prior Publication Data

US 2014/0380351 A1 Dec. 25, 2014

Related U.S. Application Data

(63) Continuation of application No. 13/428,140, filed on Mar. 23, 2012, now Pat. No. 8,856,819, which is a
(Continued)

(30) Foreign Application Priority Data

Feb. 26, 1998 (JP) .................................... 9-044848

(51) Int. Cl.
*H04N 21/24* (2011.01)
*H04N 21/442* (2011.01)
(Continued)

(52) U.S. Cl.
CPC ....... *H04N 21/2407* (2013.01); *H04N 5/4401* (2013.01); *H04N 5/765* (2013.01);
(Continued)

(58) Field of Classification Search
CPC .................................................. H04N 21/2407
See application file for complete search history.

(56) References Cited

U.S. PATENT DOCUMENTS

| 4,520,404 A | 5/1985 | Von Kohorn |
| 4,901,367 A | 2/1990 | Nicholson |
(Continued)

FOREIGN PATENT DOCUMENTS

| EP | 0777385 A2 | 6/1997 |
| JP | 5274275 | 10/1993 |
(Continued)

*Primary Examiner* — Ricky Chin
(74) *Attorney, Agent, or Firm* — Brundidge & Stanger, P.C.

(57) ABSTRACT

An information apparatus connectable with plural external apparatuses including an audio visual data outputting portion, a command input portion which inputs a command from an external apparatus for requesting audio visual data, an information managing portion which manages a number of external apparatuses to audio visual data can be distributed to be simultaneously viewed or recorded and a controller portion which controls distribution of the data to the external apparatus which sent the command depending upon a distributing condition. The controller portion makes a decision on whether the number of external apparatuses to which data can be distributed is equal to or smaller than a limited number, and controls the distribution of data to the external apparatus based on a result of the decision.

3 Claims, 12 Drawing Sheets

Related U.S. Application Data continuation of application No. 11/826,412, filed on Jul. 16, 2007, now Pat. No. 8,233,504, which is a continuation of application No. 09/245,347, filed on Feb. 5, 1999, now Pat. No. 7,257,132.

(51) Int. Cl.

| | | |
|---|---|---|
| *H04N 5/44* | (2011.01) | |
| *H04N 5/765* | (2006.01) | |
| *H04N 7/16* | (2011.01) | |
| *H04N 21/41* | (2011.01) | |
| *H04N 21/433* | (2011.01) | |
| *H04N 21/436* | (2011.01) | |
| *H04N 21/4363* | (2011.01) | |
| *H04N 21/4405* | (2011.01) | |
| *H04N 21/454* | (2011.01) | |
| *H04N 21/475* | (2011.01) | |
| *H04N 21/488* | (2011.01) | |
| *H04N 21/4367* | (2011.01) | |
| *H04N 21/45* | (2011.01) | |
| *H04N 5/775* | (2006.01) | |
| *H04N 21/472* | (2011.01) | |

(52) U.S. Cl.
CPC ......... *H04N 7/162* (2013.01); *H04N 21/4108* (2013.01); *H04N 21/4135* (2013.01); *H04N 21/4334* (2013.01); *H04N 21/4367* (2013.01); *H04N 21/43615* (2013.01); *H04N 21/43632* (2013.01); *H04N 21/4405* (2013.01); *H04N 21/44204* (2013.01); *H04N 21/454* (2013.01); *H04N 21/4508* (2013.01); *H04N 21/4751* (2013.01); *H04N 21/4882* (2013.01); *H04N 5/775* (2013.01); *H04N 21/47211* (2013.01)

(56) References Cited

U.S. PATENT DOCUMENTS

| | | | |
|---|---|---|---|
| 4,947,244 A | | 8/1990 | Fenwick et al. |
| 4,965,825 A | | 10/1990 | Harvey et al. |
| 4,975,951 A | | 12/1990 | Bennett |
| 5,375,206 A | | 12/1994 | Hunter et al. |
| 5,574,787 A | | 11/1996 | Ryan |
| 5,652,749 A | | 7/1997 | Davenport et al. |
| 5,684,799 A | | 11/1997 | Bigham et al. |
| 5,699,426 A | | 12/1997 | Tsukamoto et al. |
| 5,729,280 A | | 3/1998 | Inoue et al. |
| 5,761,416 A | | 6/1998 | Mandal et al. |
| 5,774,548 A | | 6/1998 | Bando et al. |
| 5,859,950 A | * | 1/1999 | Iwamoto .......... G11B 20/00007 386/255 |
| 5,862,299 A | | 1/1999 | Lee et al. |
| 5,872,588 A | | 2/1999 | Aras et al. |
| 5,884,141 A | | 3/1999 | Inoue et al. |
| 5,990,881 A | | 11/1999 | Inoue et al. |
| 5,991,400 A | * | 11/1999 | Kamperman ................. 380/239 |
| 6,009,116 A | | 12/1999 | Bednarek et al. |
| 6,034,832 A | * | 3/2000 | Ichimura .......... G11B 20/00086 360/60 |
| 6,154,632 A | | 11/2000 | Hata et al. |
| 6,160,796 A | | 12/2000 | Zou |
| 6,166,778 A | | 12/2000 | Yamamoto et al. |
| 6,204,774 B1 | | 3/2001 | Miwa et al. |
| 6,223,285 B1 | | 4/2001 | Komuro et al. |
| 6,226,047 B1 | | 5/2001 | Ryu |
| 6,266,481 B1 | | 7/2001 | Lee et al. |
| 6,286,140 B1 | | 9/2001 | Ivanyi |
| 6,286,142 B1 | | 9/2001 | Ehreth |
| 6,298,482 B1 | | 10/2001 | Seidman et al. |
| 6,345,389 B1 | | 2/2002 | Dureau |
| 6,349,095 B1 | | 2/2002 | Hugenberg et al. |
| 6,381,747 B1 | | 4/2002 | Wonfor et al. |
| 6,590,602 B1 | | 7/2003 | Fernandez et al. |
| 6,731,346 B1 | | 5/2004 | Nonomura et al. |
| 7,257,132 B1 | | 8/2007 | Akamatsu et al. |
| 8,233,504 B2 | | 7/2012 | Akamatsu et al. |
| 2007/0263662 A1 | | 11/2007 | Akamatsu et al. |
| 2012/0180096 A1 | | 7/2012 | Akamatsu et al. |

FOREIGN PATENT DOCUMENTS

| | | |
|---|---|---|
| JP | 05346851 | 12/1993 |
| JP | 06046014 | 2/1994 |
| JP | 07170509 | 7/1995 |
| JP | 07200492 | 8/1995 |
| JP | 8046948 | 2/1996 |
| JP | 08214369 | 8/1996 |
| JP | 099342 | 1/1997 |
| JP | 09062393 | 3/1997 |
| JP | 09083888 | 3/1997 |
| JP | 09098164 | 4/1997 |
| JP | 09130765 | 5/1997 |
| JP | 09247616 | 9/1997 |
| JP | 09284857 | 10/1997 |
| JP | 09319570 | 12/1997 |
| JP | 1049455 | 2/1998 |
| JP | 10093658 | 4/1998 |
| WO | 9638002 | 11/1996 |

* cited by examiner

FIG. 5

| | | | |
|---|---|---|---|
| 510 | CONTRACT ID | XXX-YY-ZZZ | |
| 520 | RECEIVE CONTRACT CHANNEL | CH210 | CH430 |
| 530 | VIEW CONTRACT NUMBER | 2 | 1 |
| 540 | RECORD CONTRACT NUMBER | 1 | 0 |

| RECEIVE CONTRACT CHANNEL | VIEWING APPARATUS (PRESENT OUTPUT DESTINATION) | | RECORDING APPARATUS (PRESENT OUTPUT DESTINATION) | |
|---|---|---|---|---|
| CH210 | ① | Node_ID_1 | ① | Node_ID_3 |
| | ② | | | |
| CH430 | ① | Node_ID_2 | | |

610, 611, 612, 620, 621, 622, 623, 630, 631

RECEIVER SET, INFORMATION APPARATUS AND RECEIVING SYSTEM

The present application is a continuation of application Ser. No. 13/428,140, filed Mar. 23, 2012; which is a continuation of application Ser. No. 11/826,412, filed Jul. 16, 2007, now U.S. Pat. No. 8,233,504; which is a continuation of application Ser. No. 09/245,347, filed Feb. 5, 1999, now U.S. Pat. No. 7,257,132, the contents of which are incorporated herein by reference.

BACKGROUND OF THE INVENTION

The present invention relates to a receiver set, an information apparatus and a system for receiving transmitted digital information. The present invention in particular, relates to connections of the apparatuses within the system which reproduces and records the received digital data upon a basis of a receiving contract. Hereinafter, the invention will be explained when being applied to the system, the apparatus and/or the receiver set for receiving video/audio information of various broadcast programs which are distributed by the digital broadcast services. However, the present invention not limited only to this, it also can be applied to a system and/or an apparatus relating to sending and receiving of data, such as one for data transmission, with a similar construction.

DESCRIPTION OF PRIOR ART

In recent years, digital broadcasting services using a communication satellite began in United States of America, and also Japan started digital multi-channel broadcasting using the communication satellite (CS) from 1996, therefore, various kinds of digital broadcasting services will be available in the coming future. Further, the study in digitalization of the current broadcasting with use of ground radio waves (analogue broadcasting) has also progressed.

In the current digital broadcasting services, with use of the format MPEG2-TS (Transport Stream), i.e., the multiplexing and separating method for coping with multi-programs, a plurality of programs are multiplexed and distributed, and the audio/video data of the aimed or designated program is extracted by a digital broadcast receiver set.

As the broadcasting services, in addition to a free broadcasting service, there are also offered services, including a charge or pay broadcasting service, for which a receiving contract must be made, and a PPV (pay per view) broadcasting service, with which a fee must be paid for an amount of viewing thereof, etc.

Under such the situation, in particular, in a field of household electric appliances and computers, etc., there is aggressively studied and developed a digital broadcast receiver set for receiving such the digital broadcast programs, as well as a digital TV for reproducing the received programs and a digital VTR for recording thereof.

Further, as one of such communication systems, a transmission system using IEEE 1394 Serial Bus or USB (Universal Serial Bus) is proposed, in which the data and the control signals are transmitted and/or received between or among the digital apparatuses connected by a controller bus which can transmit the data and the control signals in mixture thereof. In this system, depending upon various connection modes of the apparatuses, a node ID is automatically assigned to each apparatus thereof. If an apparatus is newly added into that system, or is extracted or taken out therefrom, a bus reset is executed, so as to automatically assign the node IDs to them corresponding to the new mode of the connection, again.

Here, in the current receiver for the digital broadcasting, only one program which is aimed or selected is extracted from the plurality of the programs which are distributed or transmitted in multiplexed condition, to be displayed onto an output device such as the TV, therefore, only one channel can be displayed to be viewed at onetime. Therefore, for a plurality of people to view the different broadcast programs respectively, there must be provided a plurality of the digital broadcast receiver sets. For instance, for viewing the plurality of digital broadcast programs on the plurality of output devices in a home, the plurality of the digital broadcast receiver sets must be purchased corresponding to the number thereof. This, however, causes a problem that it is very uneconomical or money consuming for the users.

Further, for viewing the pay broadcast programs and the PPV broadcast programs with the digital broadcast receiver sets mentioned above, a receiving contract is necessary for each one set of the digital broadcast receiver. Accordingly, the contract must be made every time when a new digital broadcast receiver set is purchased or introduced into a home, and at the same time, a control or management of receiving contracts must be made for each of the digital broadcast receiver sets separately, therefore it takes a time and labor or is rather troublesome.

Further, for viewing the PPV broadcast programs, other than the contract, a connection of the digital broadcast receiver set with a telephone circuit is also necessary so as to notify the charge information to the providers of the broadcast programs.

Accordingly, in order to provide a plurality of the digital broadcast receiver sets, a consideration must be paid not only on the location thereof but also on the construction for connecting it with the telephone circuit.

Moreover, it can be conceived that the broadcasting services basically comes to be the charge or pay services when the digitalization progresses in the future on the BS and the ground radio waves, and in that instance, any means will be necessitated for protecting from illegal viewing and recording of the programs.

SUMMARY OF THE INVENTION

An object of the present invention is to provide a multi-receiving contract service, being convenient or friendly to both the broadcast service providers and the viewers, or to provide a digital broadcast receiver set, an information apparatus and a digital broadcasting receiving system, which are widely usable and able to reproduce the recorded broadcast programs.

For achieving the object, according to the present invention, there is provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus; and outputting means for outputting said desired compressed data to said information apparatus.

Further, according to the present invention, there is provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus;

decision means for deciding whether said desired compressed data can be outputted to said information apparatuses upon a basis of whether unfair conduct is existed or not; and outputting means for outputting said desired compressed data to said information apparatus upon a decision made by said decision means.

Furthermore, according to the present invention, there is also provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus;

management means for managing information relating to a receiving contract between a data provider;

decision means for deciding whether said desired compressed data can be outputted to said information apparatuses upon a basis of the information relating to said receiving contract; and outputting means for outputting said desired compressed data to said information apparatus upon a decision made by said decision means.

Furthermore, according to the present invention, there is also provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus;

management means for managing information relating to a receiving contract between a data provider;

decision means for deciding whether said desired compressed data can be outputted to said information apparatuses upon a basis of the information relating to said receiving contract; and outputting means for outputting said desired compressed data to said information apparatus upon a decision made by said decision means.

Furthermore, according to the present invention, there is also provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus;

supervising means for supervising information relating to output to said plurality of information apparatuses;

decision means for deciding whether said desired compressed data can be outputted to said information apparatuses upon a basis of the information relating to said output; and outputting means for outputting said desired compressed data to said information apparatus upon a decision made by said decision means.

Moreover, according to the present invention, there is provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus;

coding means for coding said desired compressed data; and outputting means for outputting said desired compressed data to said information apparatus.

Furthermore, according to the present invention, there is also provided a receiver set connectable to a plurality of information apparatuses through a bus, comprising:

receiving means for receiving multiplexed and compressed data sent through a predetermined channel;

extracting means for extracting a desired compressed data from said multiplexed and compressed data on a basis of a channel requirement sent from the information apparatus;

certifying means for certifying whether said information apparatuses be a regular one or not;

decision means for deciding whether said desired compressed data can be outputted to said information apparatuses upon a basis of certification by said certifying means; and outputting means for outputting said desired compressed data to said information apparatuses on a basis of a decision made by said decision means.

Moreover, according to the present invention, there is provided an information apparatus connectable to a receiver and/or an information apparatus through a bus, comprising:

input means for inputting desired compressed data from the receiver or the other information apparatus on a basis of a channel requirement of sending to the receiver or the other information apparatus.

And also, according to the present invention, there 'is provided an information apparatus connectable to a receiver and/or an information apparatus through a bus, comprising:

decision means for deciding whether desired compressed can be inputted or not on a basis of a decision send from the receiver whether said desired compressed data can be outputted or not;

input means for inputting said desired compressed data from the receiver or the other information apparatus on a basis of a decision made by said decision means.

Furthermore, according to the present invention, there is provided an information apparatus connectable to a receiver and/or an information apparatus through a bus, comprising:

input means for inputting desired compressed data encoded from the receiver or another information apparatus, upon a channel requirement for sending to the receiver or the another information apparatus; and de-scrambling means for de-scrambling the desired compressed data scrambled.

Moreover, according to the present invention, there is provided a receiving system, in which a receiver is connected with a plurality of information apparatuses through a bus, wherein said receiver comprises:

receiving means for receiving multiplexed and compressed data which is sent on a predetermined channel;

extracting means for extracting compressed data desired from said multiplexed and compressed data upon a channel requirement which is sent from the information apparatus; and output means for outputting said desired compressed data to said information apparatus, and wherein said information apparatus comprises:

input means for inputting said desired compressed data from said receiver.

And then, according to the present invention, there is further provided a receiving system, in which a receiver is connected with a plurality of information apparatuses through a bus, wherein said receiver comprises:

receiving means for receiving multiplexed and compressed data which is sent on a predetermined channel;

extracting means for extracting compressed data desired from said multiplexed and compressed data upon a channel requirement which is sent from the information apparatus;

output means for outputting said desired compressed data to said information apparatus;

decision means for deciding whether said the desired compressed data can be outputted to said information apparatus upon a basis that there is unfairness or not; and output means for outputting the desired compressed data to said information apparatus upon a basis of the decision of said decision means, and wherein, said information apparatus comprises:

decision means for deciding whether said desired compressed can be inputted or not upon a basis of the decision whether desired compressed data can be outputted not; and input means for inputting said desired compressed data from said receiver upon a basis of the decision of said decision means.

BRIEF DESCRIPTION OF DRAWINGS

Those and other features, objects and advantages of the present invention will become more apparent from the following description when taken in conjunction with the accompanying drawings wherein:

FIG. 5 shows one example of construction of a receiving contract information data;

FIG. 6 shows one example of construction of an output destination status information;

DETAILED DESCRIPTION OF PREFERRED EMBODIMENTS

Hereinafter, embodiments according to the present invention will be fully explained by referring to the attached drawings.

Figure 1:
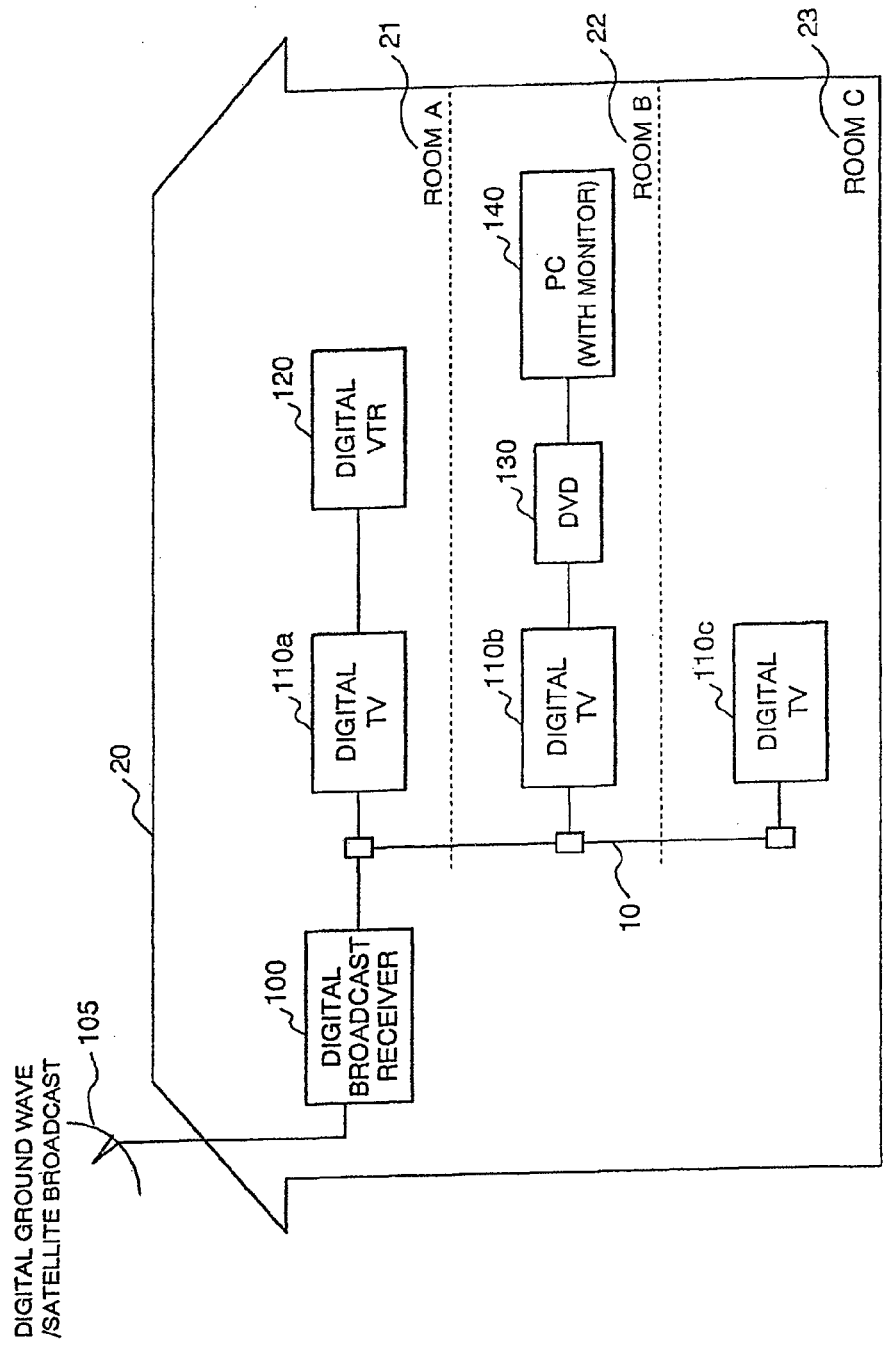
FIG. 1 shows an embodiment of the present invention, in which construction the present invention is applied to a digital broadcasting receiving system.

FIG. 1 shows an embodiment for explaining the present invention, in particular the construction in a case where the present invention is applied into a digital broadcasting receiving system within a home 20.

In this example, a digital broadcast receiver 100 for receiving digital broadcast programs with use of the communication satellites or the ground waves, digital TVs 110a-110c for displaying the broadcast programs, a digital VTR 120 for recording the broadcast program data onto a magnetic tape, a recording apparatus 130 for recording the broadcast program data onto a digital information recording medium such as the DVD, and a PC (personal computer) 140 are connected to one another through a bus 10, such as the IEEE 1394 serial bus or USB.

Here, as the digital broadcast receiver system for use in a home 20, it is so assumed that the digital TV 110a and the digital VTR 120 are provide in a room A 21, the digital TV 110b, the DVD 130 and the PC 140 in a room B 22, and the digital TV 110c in a room C 23.

However, the digital VTR 120 or the DVD 130 may be a recording apparatus, such as so-called HD, MO, etc., with which the data is recorded onto a magnetic disc or an optical disc.

Next, with reference to FIG. 2, the construction of the digital broadcast receiver set 100 will be explained.

The digital broadcast receiver set 100 comprises a tuner portion 201, a de-scrambling portion 202, a designated program divider portion 203, an output format converter 204, a coding/decoding converter 205, an AV data outputting portion 206, a controller portion 207, a command input/output portion 208, a charge information managing portion 209, a modem portion 210, a timer program managing portion 211, a receiving contract managing portion 212, an output destination supervising portion 213, and a certify processing portion 214.

The tuner portion 201 is a portion provided for selecting a one at a desire from a plurality channels, through which the programs are transmitted and for decoding the digitally coded program.

The de-scrambling portion 202 for designated programs is a portion provided for removing or canceling the scramble put onto the broadcast program data, so as to enable only a receiving contractor to receive the broadcast programs from the broadcast provider with whom the receiving contract was made.

The program divider portion 203 is a portion provided for extracting the video/audio data from the broadcast program data which is multiplexed and transmitted, corresponding to the broadcast programs at the desire of the user.

The output format converter 204 is a portion provided for converting the broadcast program data which is received at the desire of the user into an output format required by a reproducing apparatus or a recording apparatus, which are connected to the present digital broadcast receiver set 100.

The coding/decoding converter 205 is a portion provided for executing the coding process onto data and commands to be sent and for executing the decoding process onto the data and commands received, for protecting from unfair or wrongful obtaining of the data on the way, when transmitting the broadcast program data and the various commands between the output device and the recording apparatus and so on, which are connected to the present broadcast receiver set 100.

The AV data outputting portion 206 is a portion provide for sending the broadcasting program data to the output device and the recording apparatus which are connected to the present digital broadcast receiver set 100.

The controller portion 207 is a portion for totally controlling the operations of various portions in the present digital broadcast receiver set 100.

The command input/output portion 208 is a portion provided for sending and receiving the various commands between the output device and/or the recording apparatus, which are connected to the present digital broadcast receiver set 100.

The charge information managing portion 209 is a portion provided for managing the information relating to the charges when viewing and recording the pay broadcast program and/or the PPV.

The modem portion 210 is a portion provided for sending a program request instruction and/or the charge information to the broadcast provider.

The timer program managing portion 211 is a portion provided for managing the timer program information in a timer programming process of viewing and recording the broadcast programs.

The receiving contract managing portion 212 is a portion for managing the information relating to the receiving contract between the broadcast provider and the user or viewer. The output destination supervising portion 213 is a portion for supervising the device(s) and apparatus(es) to which the broadcast program data is outputted from the present digital broadcast receiver set 100, at present.

And, the certify processing portion 214 is a portion provided for certifying that it is a product regularly manufactured under an approval, to which apparatus the broadcast program data is outputted, (i.e., that the apparatus does not view the programs illegally nor copy unfairly).

One of the features of the present invention lies in that, within the present digital broadcast receiver set 110a, there are provided the designated program divider portion 203, the receiving contract managing portion 212, and the output destination supervising portion 213, thereby enabling protection of the broadcast programs from the illegal viewing and/or the unfair recording thereof.

Next, with reference to FIG. 3, the constructions of the digital TVs 110a-110c of FIG. 1 will be explained. However, all of those are same in the construction thereof, therefore, here will be explained the construction of only one of them, as that of the digital TV 110.

The digital TV 110, as the one example of the present invention, comprises an AV data input portion 301, a coding/decoding conversion portion 302, a decoder portion 303, a video DA portion 304, an audio DA portion 305, a command input/output portion 306, a controller portion 307, a timer program managing portion 308, a certify processing portion 309, a reproduced output managing portion 310, and an alarm processing portion 311.

The AV data input portion 301 is a portion provided for sending and receiving the video audio data from the digital broadcast receiver set and/or the recording apparatus, which are connected to the present digital TV 110.

The coding/decoding conversion portion 302 is provided for executing the coding process on the data and commands to be sent or for executing the decoding process on the data and commands to be received, for protecting them from the unfair obtaining on the way, when sending and/or receiving the broadcasting program data and/or the various commands between the digital broadcast receiver set and the recording apparatus, which are connected to the present digital TV(s) 110.

The decoder portion 303 is provided for decoding the compressed video/audio data to be extended into the original video/audio data.

The video DA portion 304 is provided for converting the video data which is extended by the decoder portion 303 into an analogue video signal to be outputted.

The audio DA portion 305 is provided for converting the audio data which is extended by the decoder portion 303 into an analogue audio signal to be outputted.

The command input/output portion 306 is provided for sending and receiving the various commands between the digital broadcast receiver set and the recording apparatus which are connected to the present digital TV 110.

The controller portion 307 is provided for totally controlling operations of various portions in the present digital TV 110.

The timer program managing portion 308 is provided for managing timer program information in the process of timer programming for the timer view (i.e., the viewing with use of the timer) of the broadcast programs.

The certify processing portion 309 is provided for executing the certifying process to decide whether the apparatus, i.e., the digital broadcast receiver set or the recording apparatus, is regularly certified and is produced or not.

The reproduced output managing portion 310 is provided for deciding whether the present digital TV 110 is reproducing the charge or pay broadcasting program or not at present.

The alarm processing portion 311 is provided for notifying that the broadcast program which is designated by the user 'is unable to be viewed, or for notifying that the viewing at the present time will be interrupted.

In the same manner, with reference to FIG. 4, the construction of the digital VTR 120 of FIG. 1 will be explained. Further, the DVD 130 has also similar construction thereto.

The digital VTR 120 comprises an AV data input/output portion 410, a coding/decoding conversion portion 420, a recording/reproducing portion 430, a command input/output portion 440, a controller portion 450, a recording management portion 460, an alarm processing portion 470, a timer program managing portion 480, and a certify processing portion 490.

The AV data input portion 401 is a portion provided for sending and receiving the video audio data between the digital broadcast receiver set and/or the recording apparatus, which are connected to the present digital VTR 120.

The coding/decoding conversion portion 420 is a portion being same to the coding/decoding (scrambling/de-scrambling) conversion portion 302 in the above-mentioned present digital TV 110.

The recording/reproducing portion 430 is a portion provided for executing the recording and reproducing of the video/audio data received.

The command input/output portion 440 is a portion same to the command input/output portion 306 in the above-mentioned present digital TV 110.

The controller portion 450 is a portion provided for totally control the operations of various portions in the present digital VTR 120.

The recording management portion 460 is a portion for deciding whether the present digital VTR is recording the charge or pay program at present or not.

The alarm processing portion 470 is provided for notifying that the broadcast program which is designated by the user is unable to be recorded, or for notifying that the recording at the present time will be interrupted.

The timer program managing portion 480 is provided for managing timer program information in a process of programming the timer recording of the broadcast programs.

The certify processing portion 490 is same to the certify processing portion 309 in the above-mentioned present digital TV 110.

Next, with reference to FIG. 5, the contents of a receiving contract information data 500 which are controlled or managed by the receiving contract managing portion 212 in the digital broadcast receiver set 100.

The receiving contract information data 500 is composed of a contract ID 510, a receiving contract channel 520, a number of the viewing contracts 530, and a number of recording contracts 540.

The contract ID 510 is an only one identifier for identifying to be the user with whom the broadcasting provider made the receiving contract (i.e., the digital broadcast receiver set 100), and it is determined when the receiving contract is made.

The receiving contract channel 520 indicates the channel through which the user is able to view or record the programs upon the receiving contract identified by the contract ID 510. In this example, the contracts are made for two of the channel 210 (CH 210) and the channel 430 (CH 430).

The number of viewing contracts 530 indicates a number of the output apparatuses on which the broadcast program data can be seen or viewed at the same time by the user through the receiving contract channel 520. In this example, the channel 210 can be viewed on two (2) sets at the same time, and the channel 430 on only one (1) set.

The recording contract number 540 indicates the number of the recording apparatuses on which the broadcast program data can be outputted to be recorded at the same time through the receiving contract channel 520. In this example, the channel 210 can be outputted for recording only to one (1) set, while the channel 430 zero (0) set.

Figure 2:
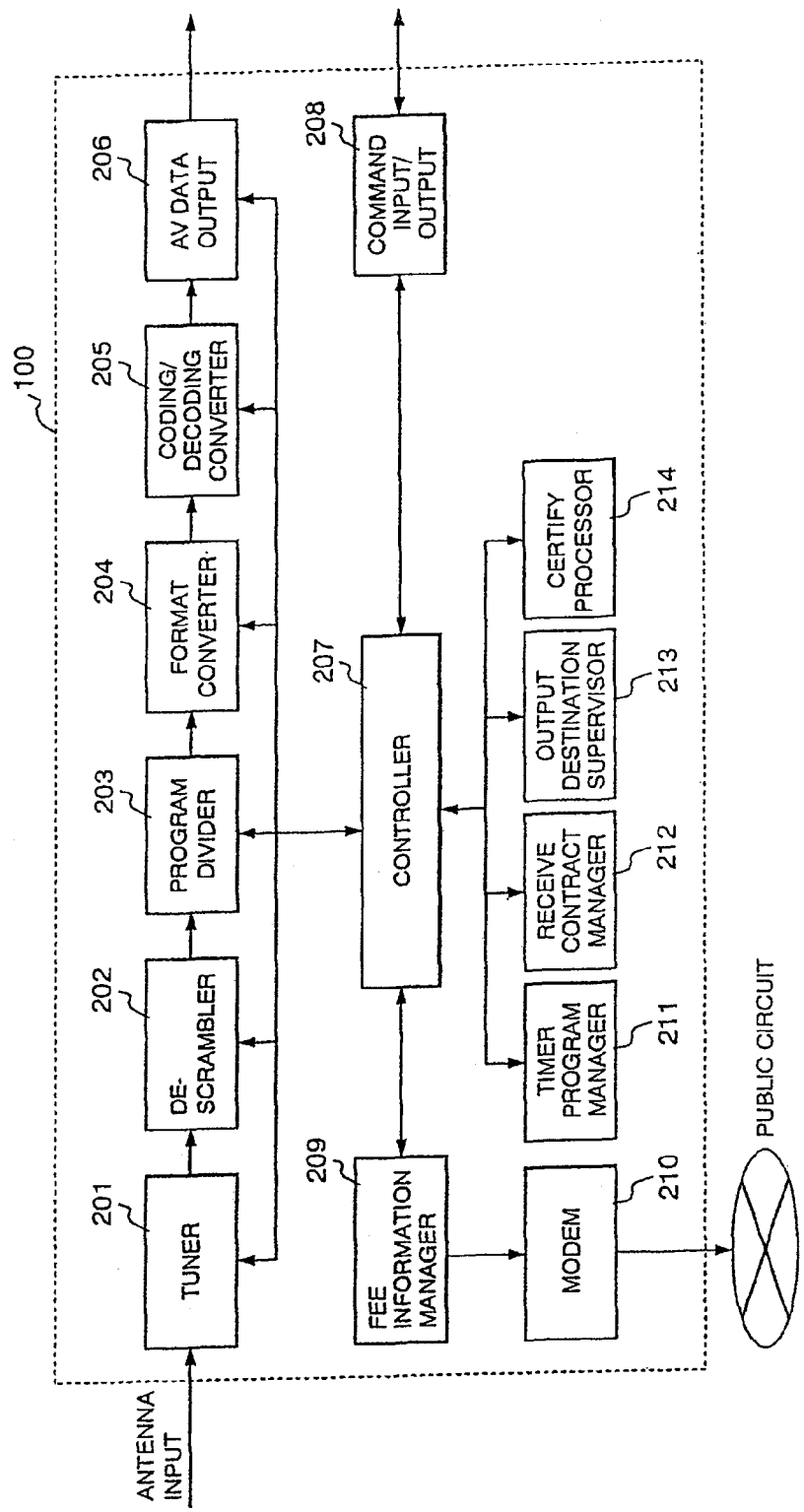
FIG. 2 shows one example of construction of a digital broadcast receiver set of FIG. 1.

Next, with reference to FIG. 6, an example of contents of the output destination status information data, which is managed in the supervising portion 213 of FIG. 2, within the digital broadcast receiver set 100 of FIGS. 1 and 2.

The output destinations status information data 600 is composed of a receiving contract channel 610, a "viewing apparatus" 620, and a "recording apparatus" 630.

The receiving contract channel 610 is same to the above-mentioned receiving contract channel 520. Namely, in this example, the channel 210 (CH 210) and the channel 430 (CH 430) are shown.

The "viewing apparatus" 620 indicates the only one identifier for identifying the output apparatus to which the broadcast program data on the receiving contract channel 610 is outputted at present, among the plurality of the output apparatuses connected onto the bus 10. This may be an address of the apparatus which is previously given to each apparatus on the bus. In this example, with the channel 210, it is indicated that only one (1) set of the apparatuses is outputted at present, and that the broadcast program data is outputted to the output apparatus 621 identified by a Node_ID_1.

The "recording apparatus" 630 indicates the only one identifier for identifying the recording apparatuses to which the broadcast program data on the receiving contract channel 610 is outputted at present, among the plurality of the recording apparatuses connected onto the bus 10. This may be an address of the apparatus which is previously given to each apparatus on the bus. In this example, with the channel 210, it is indicated that only one (1) set of the apparatuses is recording at present, and that the broadcasting program data is outputted to the output apparatus 631 identified by a Node_ID$_{13}$ 3.

Here, the output destinations status information data 600 is produced based on the contents of the above-mentioned receiving contract information data 500, which is managed in the above-mentioned receiving contract managing portion 212 and read into by the output destination supervising portion 213 when an electric power of the above-mentioned digital broadcast receiver set 100 is turned ON.

Next, with reference to FIGS. 7 and 8, an explanation will be given on a process in which the digital broadcast receiver set 100 of FIGS. 1 and 2 distributes the broadcast programs at the desire of the user to the digital TVs 110a-110c as the output apparatuses. For easily understanding, it is assumed that the broadcast program provided on the channel 210 is viewed on the digital TV 110b and is also recorded onto the DVD 130, at the present, and a receiving requirement to the channel 210 is newly issued from the digital TV 110a.

Figure 7:
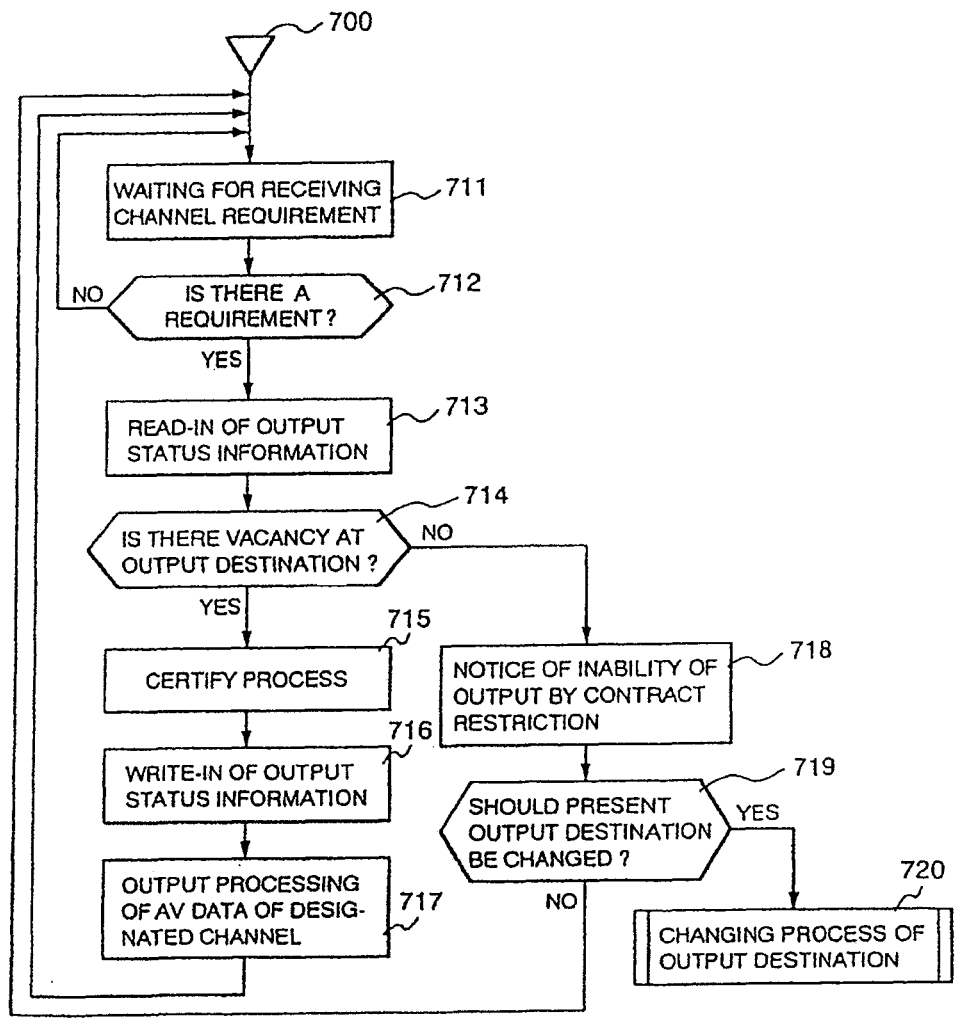
FIG. 7 is a flow chart for showing steps of distributing the broadcast programs in the digital broadcast receiver set.

First of all, with reference to FIG. 7, a process of distributing the broadcast programs at the side of the digital broadcast receiver set 100 of FIGS. 1 and 2.

The digital broadcast receiver set 100, after being turned ON with the electric power and completing a set-up process thereof, is in a condition of waiting for receiving the channel requirement from the other apparatuses connected with the bus 10 (step 711), and then watches whether there is the, channel requirement or not in the command input/output portion 208 of FIG. 2 (step 712). Here, when receiving a distribution requirement of the channel 210 from the digital TV 110a of FIG. 1, the controller portion 207 of FIG. 2 reads in the output destinations status information data which are managed in the output destination supervising portion 213 (step 713), and checks whether the broadcast program at the desire of the user can be distributed or not within a region of the receiving contract (step 714). According to the output destination status information data 600 of FIG. 6, the viewing contract number is two (2) with respect to the receiving contract channel 210 (see reference numeral 611 in the figure), and as mentioned previously, in FIG. 1, the broadcast program is distributed at present to the digital TV 110b (the output apparatus 621) and the DVD 130 (the recording apparatus 631). Accordingly, the distribution requirement from the digital TV 110a of FIG. 1 is within the range of the contracted viewing number, therefore it is possible to distribute the broadcast program, then the fact is notified to the digital TV 110a of FIG. 1 through the command input/output portion 208 of FIG. 2. And, in the certify processing portion 214 of FIG. 2, it is certified whether the digital TV 110a is the apparatus that is regularly certified and produced or not (i.e., whether it is the apparatus contributing the illegal viewing or not) (step 715), and if it is decided to be the regular or proper apparatus then is written into the "viewing apparatus" 622 in the above-mentioned output status information data 600 by the apparatus ID indicative of the digital TV 110a of FIG. 1 (step 716). Then, the decoding process is treated upon the broadcast program data on the channel 210 in the coding/decoding conversion portion 205, and it is distributed from the AV data output portion 206 to the digital TV 110a of FIG. 1 (step 717). After the distribution, it turns back into the condition of waiting for receiving the channel requirement (step 711). Next, following the processes mentioned in the above, when the distribution requirement of the channel 210 is received from the digital TV 110c of FIG. 1, in the same manner mentioned in the above, the processes in the steps 713 and 714 are executed. As a result of this, it exceeds the viewable contract number two (2) of the receiving contract channel 210, therefore it is impossible to distribute the broadcast program and then that fact is notified to the digital TV 110c of FIG. 1 (step 718). Then, it is checked whether there is a requirement to alter or change the present distribution designation or not from the digital TV 110c (step 719). If there is no altering requirement, the step turns back into the condition of waiting for receiving the channel requirement (step 711), while if there is the altering requirement, a process for altering or changing the distribution designation is executed (step 720). In more detail of this altering process will be described later with referring to FIG. 9.

Next, with referring to FIG. 8, an explanation will be given on a process of receiving and reproducing the broadcasting program at the desire the user in the digital TV 110a and 110c.

Figure 3:
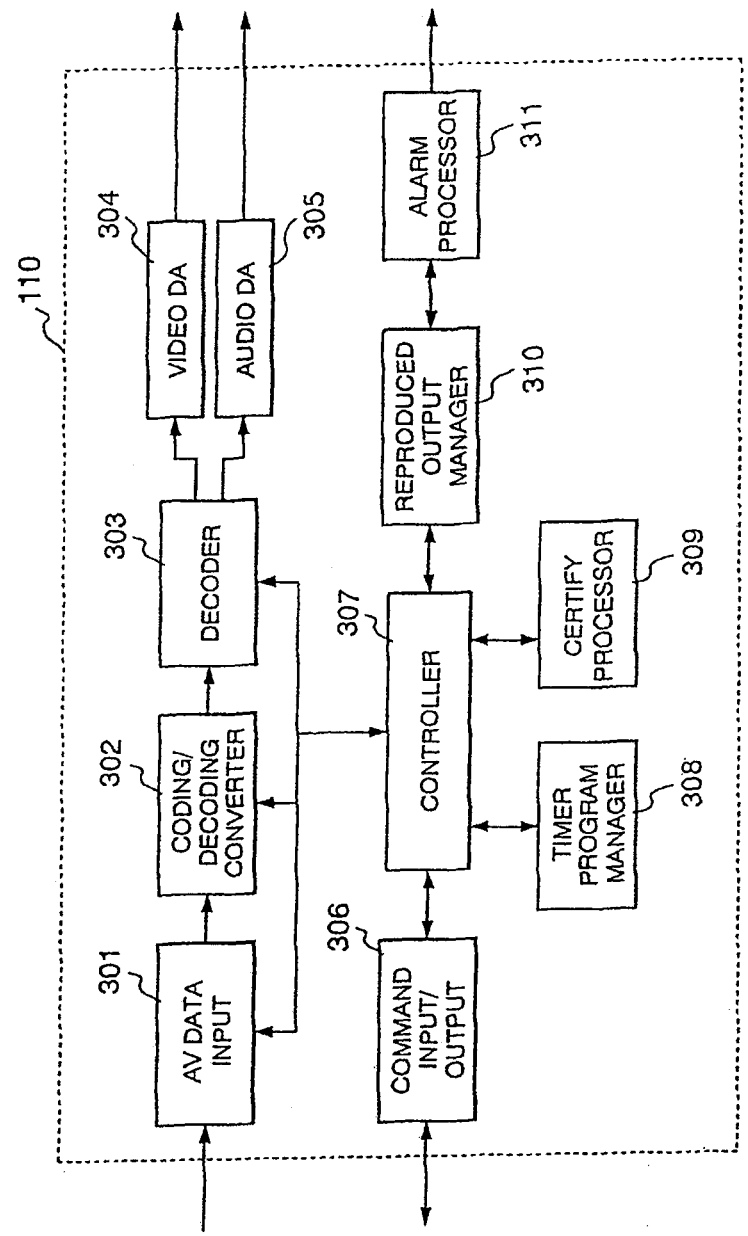
FIG. 3 shows one example of construction of an output device such as a TV in FIG. 1.

First, when the channel is selected by the user with use of the input device, such as a remote controller or the like (step 800), the digital TV 110a of FIG. 1 issues a command for requiring the broadcast program on the channel to be distributed to it at the desire of the user, through the command input/output portion 306 of FIG. 3 to the digital broadcasting receiver 100 of FIGS. 1 and 2 (step 810). Then, the determination is made whether the broadcast program is distributed from the digital broadcast receiver set 100 or not (step 820). As the result of this, as was mentioned previously, since the distribution requirement of the digital TV 110a is accepted in the digital broadcast receiver set 100, the digital TV 110a receives the decision that the distribution is possible. After that, the certify processing is executed between the digital broadcast receiver set 100 (step 830), and the AV data input portion 301 of FIG. 3 receives the code-processed broadcast program data which is distributed from the digital broadcast receiver set 100 (step 840). Then, the removal of the coding onto the broadcast program data is executed in the coding/decoding portion 302, and then is divided into the video data and the audio data in the decoder portion 303. Thereby, the video data and the audio data are outputted to the user at the video DA portion 304 and the audio DA portion 305, respectively (step 850).

Next, an explanation will be given on a case where the digital TV 110c of FIG. 1 issues the distribution requirement of the broadcast program. In those steps 800 through 820, the same processes as mentioned in the above are executed. Since the digital broadcast receiver set 100 refuses the following distribution requirement received from the digital TV 110c, the digital TV 110c receives the notice that it cannot distribute in the step 820. Then, the digital TV 110c notifies to the user by displaying the alarm or warning display screen noticing that the desired broadcast program cannot be viewed, or audibly explaining or indicating the alarm or warning in the alarm processing portion 311 (step 860). And, it is decided whether the requirement for alternating or changing the present output destination of the digital broadcast receiver set 100 is instructed from the user or not (step 870). As the result of this, if there is a requirement of interrupting the viewing of either one of the digital TV 110 an and 110b, which are presently outputting the view, from the user since the user insists to view with the digital TV 110c, the requirement for alternating or changing the output destination is issued to the digital broadcasting receiver 100 (step 880), thereby executing the alternating or changing process of the output destination (step 890). More detail of the alternating or changing process will be mentioned later with referring to FIG. 10. While, in the step 870, the process is ended in the case where the alternation or change of the output designation is not instructed from the user.

Next, with referring to FIG. 9, the detail of the alternating or changing process of the distribution destination for the broadcast programs (i.e., in the step 720) at the side of the digital broadcast receiver set 100 of FIGS. 1 and 2 will be explained.

Figure 9:
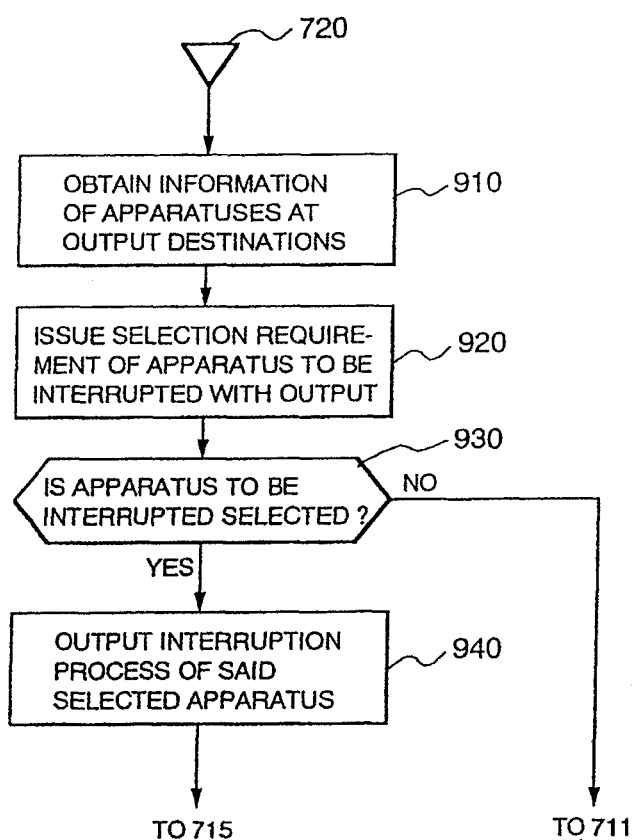
FIG. 9 is a flow chart for showing steps of alternating the present distributed designation of the broadcast programs in the digital broadcast receiver set.

The digital broadcast receiver set 100 reads in the contents of the output status information data 600 of FIG. 6, which is managed in the output destination supervising portion 213 of FIG. 2, when it receives the requirement for alternating or changing the distribution destination for the broadcast program from the digital TV 110c of FIG. 1, and obtains the information relating to the apparatus to which the output is presently provided (step 910 in FIG. 9). Then, it sends the information to the digital TV 110c so as to require it to select the apparatus to be interrupted with the output, among the apparatuses (step 920). And, it decides whether the apparatus to be interrupted is selected by the user or not (step 930). As the result of this, when no apparatus to be interrupted is selected by the digital TV 110c, it turns back into the condition of waiting for receiving the channel requirement (step 711). When the apparatus to be interrupted is selected by the digital TV 110c, for example, when the digital TV 110a is selected, first of all to the digital TV 110a is given the notice that the present distribution of program will be interrupted and the program distribution is interrupted directly after that or after a few minutes later than that. And, the data relating to the digital TV 110a, which is described in the output status information data 600, is deleted (step 940). Then the processes after the above-mentioned certify processing (the step 715) are executed.

Figure 10:
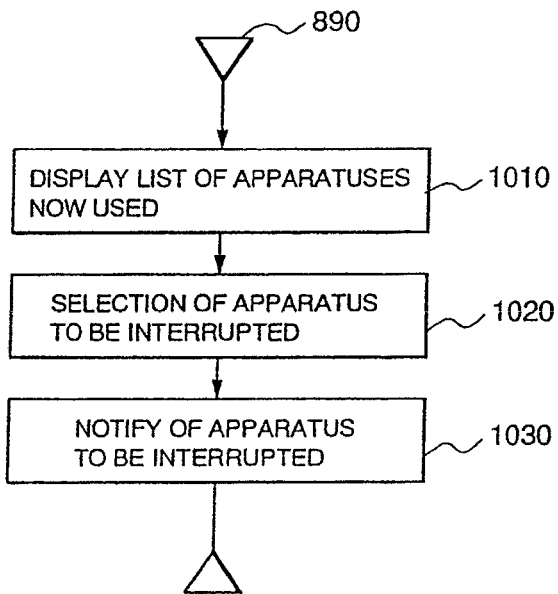
FIG. 10 is a flow chart for showing steps of alternating the present distributed designation of the broadcast programs in the digital TV.

Next, with referring to FIG. 10, detailed explanation will be given on the process (the step 890) of alternating or changing the distribution destination of the broadcast program at the side of the digital TV 110c of FIGS. 1 and 2.

The digital TV 110c displays a screen listing up the apparatuses which are presently used (step 1010) on the basis of the information relating to the present output destination which is sent simultaneously, when it receives the selection requirement of the apparatus to be interrupted from the digital broadcast receiver set 100, and lets the user to select the apparatus to be interrupted among them (step 1020). Then, it notifies to the digital broadcast receiver set 100 on the apparatus which is selected (step 1030).

Figure 8:
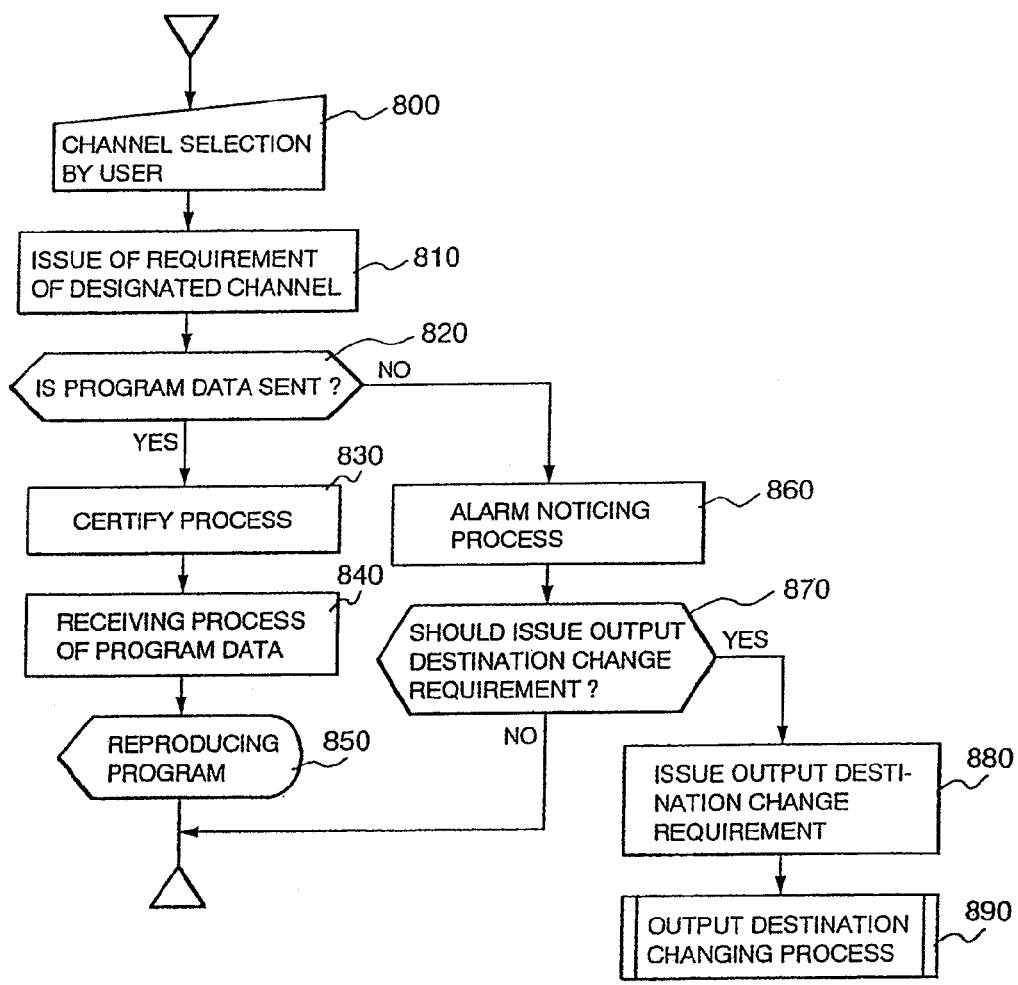
FIG. 8 is a flow chart for showing steps of receiving and reproducing the broadcast programs in a digital TV.
Figure 11:
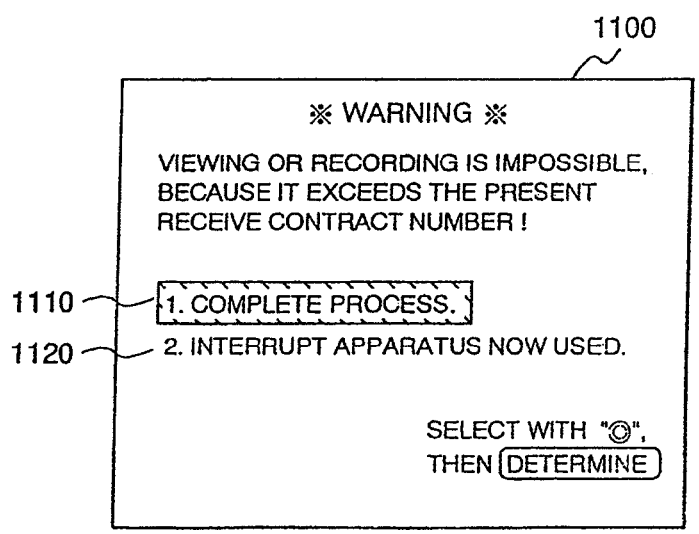
FIG. 11 shows an example of an alarming or warning display which is indicated by the digital TV or the recording apparatus.

Here, an example of the alarming or warning screen 1100 displayed to the user by the digital TV 110c of FIG. 1 in the step 860 of FIG. 8 is shown in FIG. 11. On the displayed screen 1100, if the user selects an item "complete process" 1110, the process of requiring the program distribution is completed.

Figure 12:
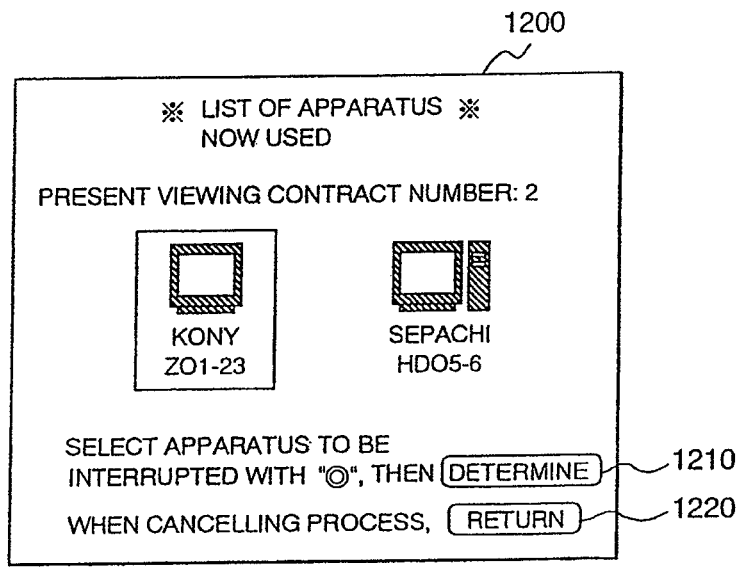
FIG. 12 shows an example of a list display of apparatuses or devices being presently used, by the digital TV or the recording apparatus.

If the user selects an item "interrupt apparatus now used" 1120, a list-up screen 1200 of the apparatuses which are presently used as shown in FIG. 12 is displayed in the step 1010. On the screen 1200, if the user instructs <return> 1220, the screen turns back to the screen 1100. If the user selects the apparatus to be interrupted and instructs <determine> 1210, it waits for the distribution of the desired broadcast program.

Figure 13:
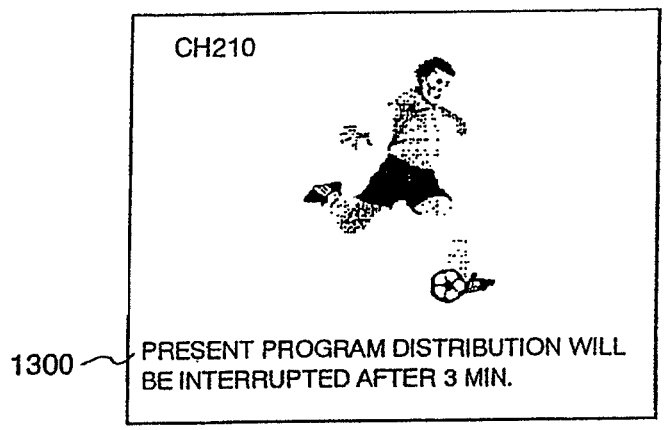
FIG. 13 shows an another example of the alarming or warning display which is indicated by the digital TV or the recording apparatus.

Further, in the step 940, the digital TV 110a, to which the interruption of program distribution is notified from the digital broadcast receiver set 100, displays such the alarming or warning screen 1300 as shown in FIG. 13.

In the example mentioned in the above, there are mainly mentioned about the processes of program distribution among the digital broadcast receiver set 100 and the digital TVs 110a-110c.

Next, a brief explanation will be given of the process of program distribution with the digital VTR 120 or the DVD 130.

First, it is assumed that the digital VTR 120 is recording the broadcast program of the channel 210, and that the apparatus ID relating to the digital VTR 120 is described into the "recording apparatus" within the output status information data 600 of the output destination supervising portion 213 of the digital broadcast receiver set 100. Here, if there is a recording requirement of the same broadcast program from the DVD 130, the above-mentioned recording requirement is not accepted since the recording contract number is one (1).

Figure 4:
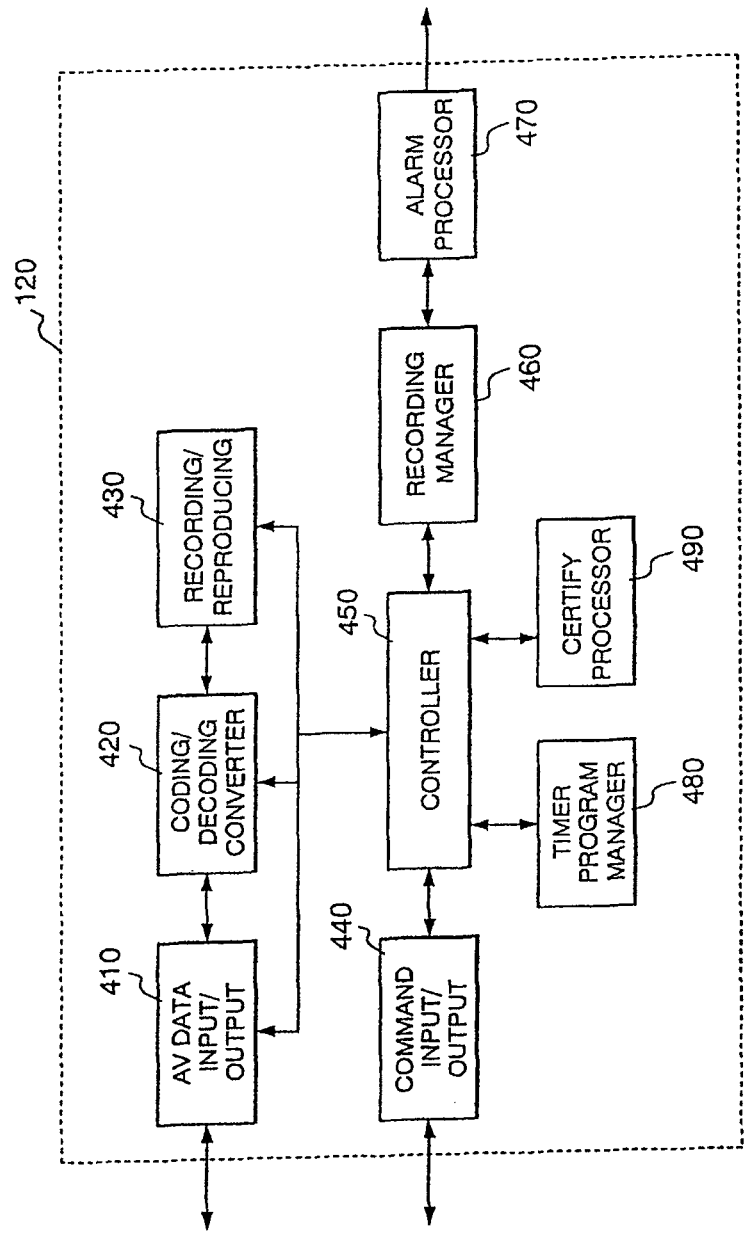
FIG. 4 shows one example of construction of a recording apparatus such as a VTR and a DVD.

From the above, in the present embodiment, the designated program dividing portion 203 of FIG. 2, the receiving contract managing portion 212 and the output destination supervising portion 213 are provided in the digital broadcast receiver set 100, with in the system where the digital broadcast receiver set 100, the output apparatuses 110 (110a-110c) and the recording apparatuses 120 and 130 are connected to the control bus 10, as shown in FIG. 1, and the alarm processing portions 311 and 470 of FIGS. 3 and 4 are provided in the output apparatuses 110 (110a-110c) and the recording apparatuses of FIG. 1. And, as mentioned in the above, if the digital broadcast receiver 100 receives the output requirement of broadcast program, it checks whether the requirement should be accepted or rejected on the contents of the receiving contract. Thereby, it is possible to protect the digital broadcast programs from the illegal viewing or the unfair recording with ease.

Here, the output destination supervising portion 213 of the digital broadcast receiver set 100 supervises only the number of the present output destinations, but not the information relating to the output designations. In this instance, a requirement for obtaining the information relating to the present output condition or the recording condition and the programs is issued directly to the reproduced output managing portion 310 and the recording management portion 460 of the each apparatus connected onto the bus 10, so as to obtain the information relating to the each apparatus. Further, in the present embodiment, the digital broadcast receiving system can be constructed by only one (1) set of the digital broadcast receiver set 100, therefore, there is no necessity of purchasing the plurality of digital broadcast receiver sets, omitting the labor and time for making the receiving contracts which are separately necessary, thereby reducing the burden on the user.

Figure 14:
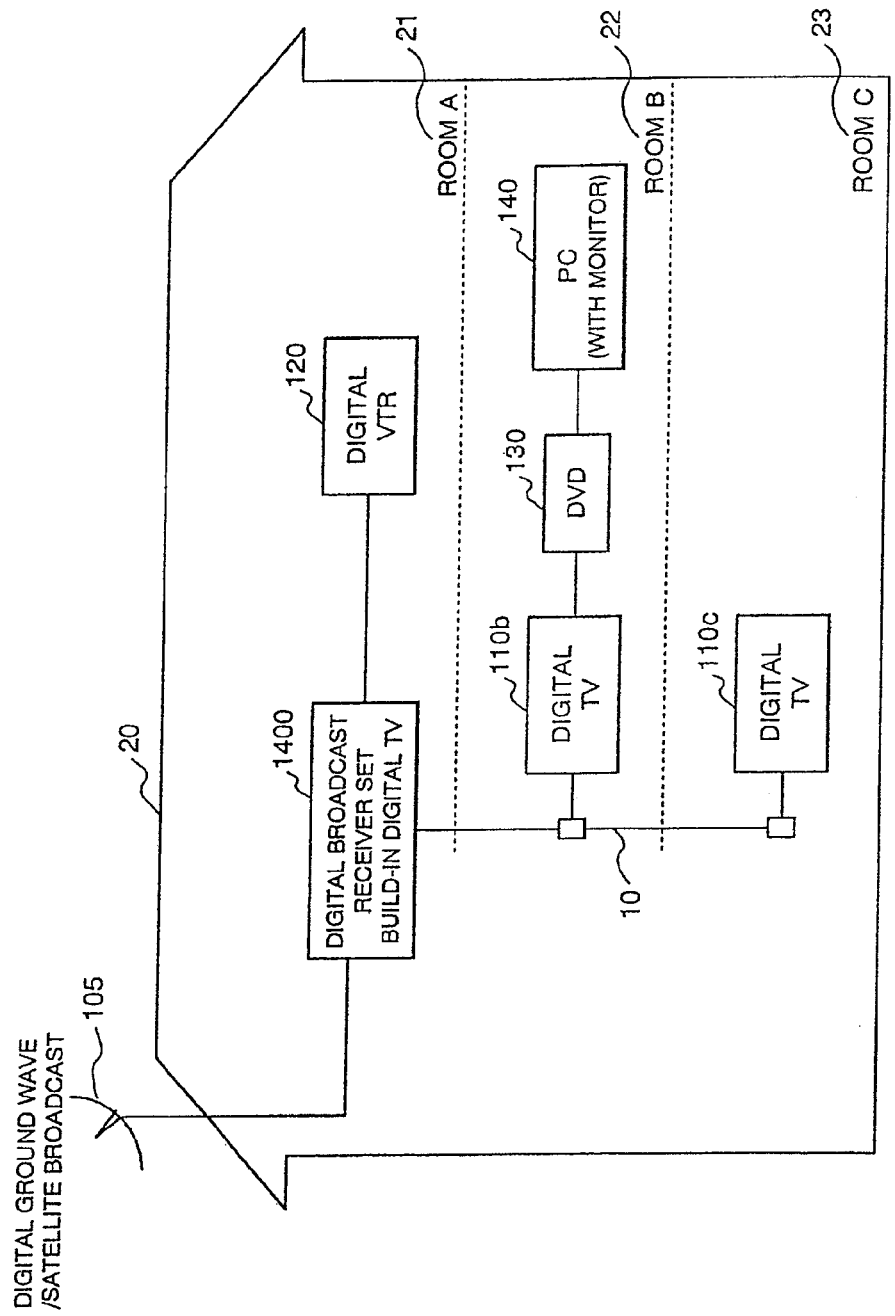
FIG. 14 shows an another embodiment of the present invention, in which construction the present invention is also applied to the digital broadcast receiving system; and, FIG. 15 shows the construction of the digital TV, in particular, in which the digital broadcast receiver set in FIG. 14 is installed (i.e., a digital broadcast receiver set built-in digital TV).
Figure 15:
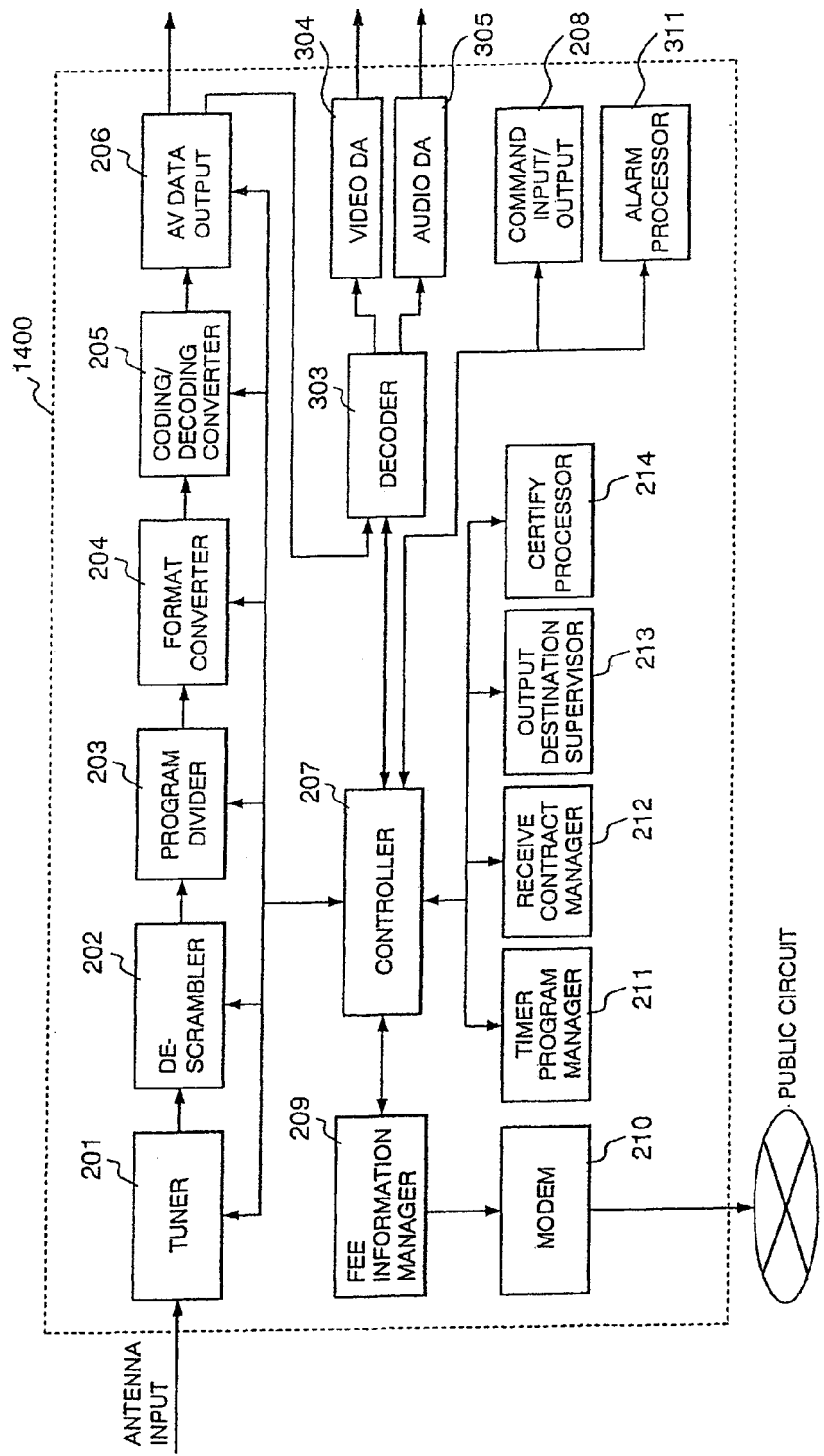

However, the digital broadcast receiver set 100 of FIG. 1 may be combined as one body together with either one of the output apparatus and the recording apparatus, or with both of them, as shown in FIGS. 14 and 15.

In the example of FIG. 14, the digital TV 1400, which has a built-in digital broadcast receiver set in it, distributes the programs to the other output apparatus(es) and/or the recording apparatus(es). In this manner, the receiver set 100, which is combined with or built-in within the output apparatus and/or the recording apparatus, distributes the programs to the other output apparatus(es) and/or the recording apparatus (es).

FIG. 15 shows one example of the digital TV 1400 built in with the digital broadcast receiver set, and it is constructed by combining the digital broadcasting receiver 100 of FIG. 2 and the digital TV 110 of FIG. 3. In this manner, the receiver set formed with the output apparatus and the recording apparatus as one body can be constructed by combining the digital broadcast receiver set 100 of FIG. 2, the digital TV 110 of FIG. 3, and the digital VTR 120 of FIG. 4.

Furthermore, it can be also conceived that a priority is set up in advance, so that the digital TV will not interrupted with the present output from the digital broadcast receiver set 100, in the similar manner as in the timer programming operation.

According to the invention mentioned in the above, the following effects can be obtained:

(1) Broadcasting program can be distributed or transmitted to the plurality of apparatuses at the same time by one receiver for the digital broadcasting, and the digital broadcasting programs can be viewed in a home or in a condominium including several households therein, efficiently and economically.

(2) A control or management of the receiving contracts becomes easy to be done.

(3) Illegal viewing and unfair recording of the charge or pay programs, including the PPV broadcasting program, can be easily inhibited thereby.

While we have shown and described several embodiments in accordance with our invention, it should be understood that disclosed embodiments are susceptible of changes and modifications without departing from the scope of the invention. Therefore, we do not intended to be bound by the details shown and described herein but intend to cover all such changes and modifications fall within the ambit of the appended claims.

What is claimed is:

1. A data distribution apparatus communicatively connected with a plurality of connection equipment, comprising:

a distributer distributing data, simultaneously, to the plurality of connection equipment;

a memory storing a limiting number for limiting the plurality of connection equipment, to which the data can be distributed from the distributer;

a receiver receiving a signal for requesting distribution of the data from the plurality of connection equipment; and a distribution controller, communicatively connected to the data distribution apparatus, controlling distribution of the data to a connection equipment sending out a data distribution requesting signal when receiving the data distribution requesting signal from the plurality of connection equipment, depending upon a distribution condition of the data to the connection equipment other than the plurality of connection equipment which send out the data distribution requesting signal, wherein the distribution controller determines a number of the plurality of connection equipment data, wherein the distribution controller makes a decision based on whether the plurality of connection equipment are authenticated to be regular connection equipment and whether the number of the plurality of connection equipment under a distribution of data is equal to or smaller than the limiting number, when receiving the data distribution requesting signal from the connection equipment, wherein the data is distributed from the distributer, simultaneously, to the plurality of connection equipment using a result of the decision, and wherein the data is not distributed by the receiver during the distribution of data from the distributer to the connection equipment, thereby controlling the distribution of data to the connection equipment sending out the data distribution requesting signal by using a result of the decision.

2. A digital data transmitting/receiving system comprising:

a data distribution apparatus configured to transmit digital data, the digital data including video and audio, the data distribution apparatus comprising:
   a distributer distributing data, simultaneously, to a plurality of connection equipment,
   a memory storing a limiting number for limiting the plurality of connection equipment, to which the data can be distributed from the distributer,
   a receiver receiving a signal for requesting distribution of the data from the plurality of connection equipment, and
   a distribution controller, communicatively connected to the data distribution apparatus, controlling distribution of the data to a connection equipment sending out a data distribution requesting signal when receiving the data distribution requesting signal from the plurality of connection equipment, depending upon a distribution condition of the data to the connection equipment other than the plurality of connection equipment which send out the data distribution requesting signal,
      wherein the distribution controller determines a number of the plurality of connection equipment data,
      wherein the distribution controller makes a decision based on whether the plurality of connection equipment are authenticated to be regular connection equipment and whether the number of the plurality of connection equipment under a distribution of data is equal to or smaller than the limiting number, when receiving the data distribution requesting signal from the connection equipment,
      wherein the data is distributed from the distributer, simultaneously, to the plurality of connection equipment using a result of the decision and
      wherein the data is not distributed by the receiver during the distribution of data from the distributer to the connection equipment, thereby controlling the distribution of data to the connection equipment sending out the data distribution requesting signal by using a result of the decision;
wherein the plurality of connection equipment are communicatively connected to the data distribution apparatus via a network and configured to receive the digital data transmitted from the data distribution apparatus,
wherein each of the plurality of connection equipment comprises a digital data receiver configured to receive the digital data transmitted from the distributer, and
wherein the distributer transmits the digital data, simultaneously, to the plurality of connection equipment, each of the plurality of connection equipment being addresses of transmission of the digital data, when the plurality of connection equipment, being the addresses of transmission of the digital data, are authenticated to be regular apparatuses, and when a number of the plurality of connection equipment, being the addresses of transmission of the digital data, is confirmed within a predetermined limit number.

3. A digital data transmitting/receiving method in a digital data transmitting/receiving system, the digital data transmitting/receiving system including a data distribution apparatus configured to transmit digital data including a video and audio, and a plurality of connection equipment, each of the plurality of connection equipment being connected to the data distribution apparatus via a network and being configured to receive the digital data transmitted from the data distribution apparatus, the method comprising:

transmitting the digital data, simultaneously, from a distributor of the data distribution apparatus to the plurality of connection equipment that are connected to the network;

receiving, by a receiver, a signal for requesting distribution of the data from the plurality of connection equipment;

controlling, by a distribution controller communicatively connected to the data distribution apparatus, distribution of the data to a connection equipment sending out a data distribution requesting signal when receiving the data distribution requesting signal from the plurality of connection equipment depending upon a distribution condition of the data to the connection equipment other than the plurality of connection equipment which send out the data distribution requesting signal;

determining, by the distribution controller, a number of the plurality of connection equipment data;

deciding, by the distribution controller, based on whether the plurality of connection equipment are authenticated to be regular connection equipment and whether the number of the plurality of connection equipment under a distribution of data is equal to or smaller than the limiting number, when receiving the data distribution requesting signal from the connection equipment;

distributing, by the distributer, the data simultaneously to the plurality of connection equipment using a result of the decision;

controlling, by the receiver, the distribution of the data from the distributer to the plurality of connection equipment sending out the data distribution requesting signal by using a result of the decision; and receiving the digital data transmitted from the distributor of the data distribution apparatus, wherein the plurality of connection equipment being addresses of transmission of the digital data, when the plurality of connection equipment, being the addresses of transmission of the digital data, are authenticated to be regular apparatuses, and when a number of the plurality of connection equipment, being the addresses of transmission of the digital data, is confirmed within a predetermined limit number.

* * * * *